Feb. 13, 1923.
J. A. JOHNSTON
1,445,596
FRUIT GATHERER
Filed Feb. 19, 1921
2 sheets-sheet 1
FIG. 1.
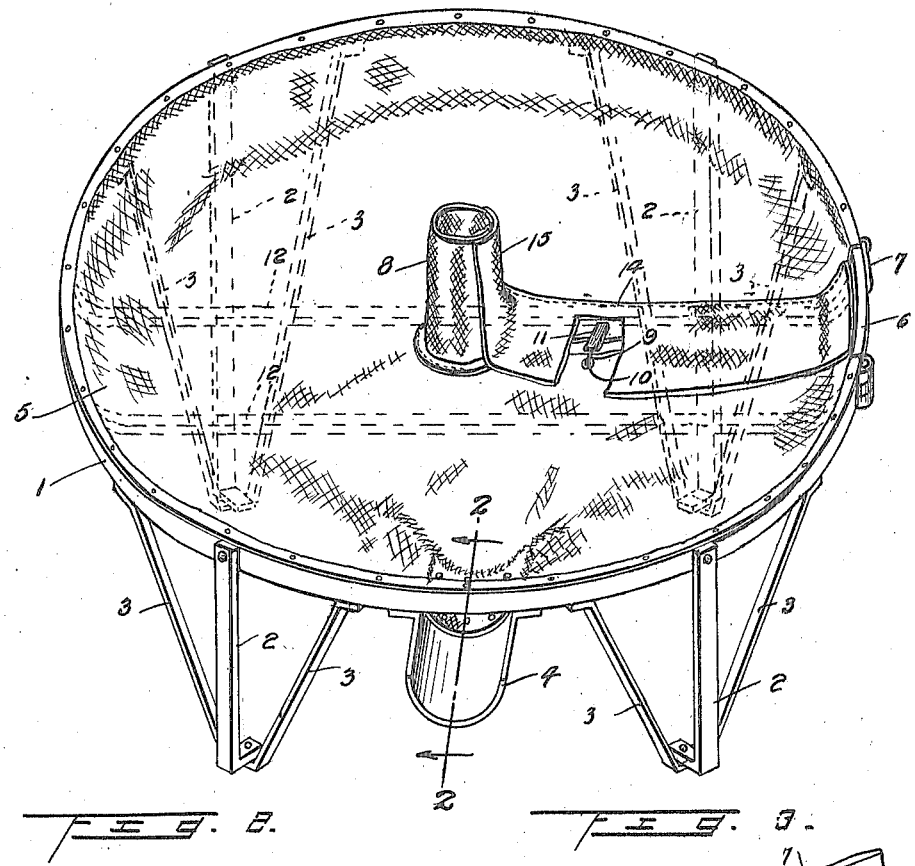
FIG. 2.
FIG. 3.
FIG. 7.
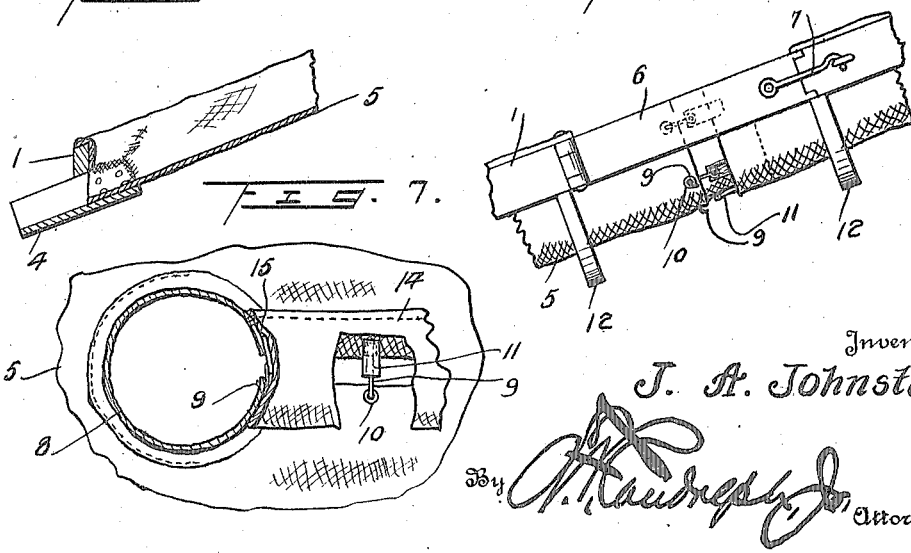
Inventor
J. A. Johnston.
By
Attorney Feb. 13, 1923.　　　　　　　　　　　　　　　　　　1,445,596
J. A. JOHNSTON
FRUIT GATHERER
Filed Feb. 19, 1921　　　　2 sheets-sheet 2
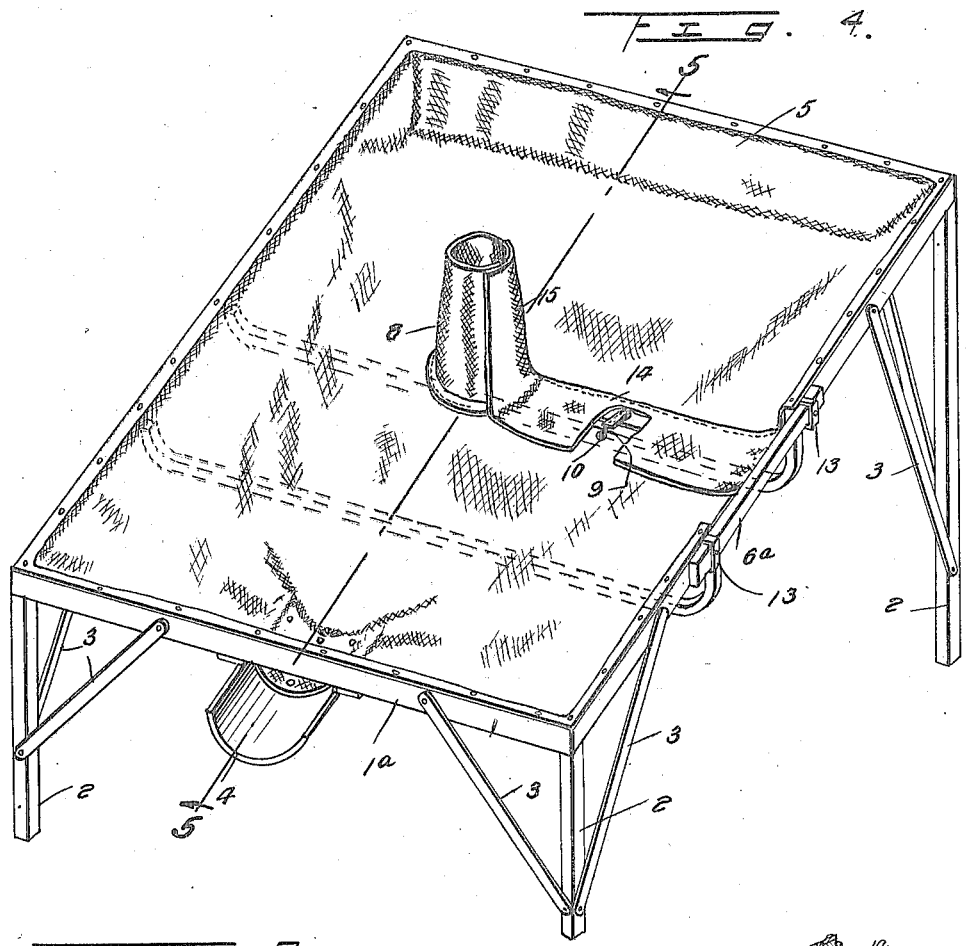
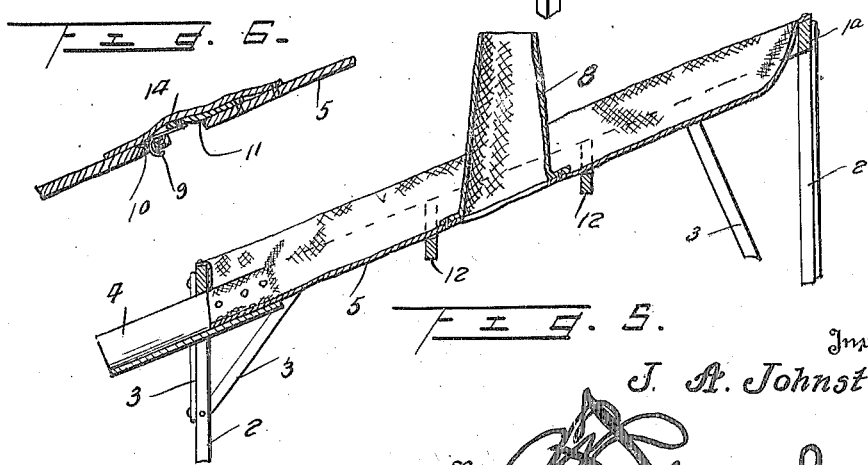

Patented Feb. 13, 1923.

1,445,596

UNITED STATES PATENT OFFICE.

JOHN A. JOHNSTON, OF SCOTTSBLUFF, NEBRASKA.

FRUIT GATHERER.

Application filed February 19, 1921. Serial No. 446,383.

*To all whom it may concern:*

Be it known that I, JOHN A. JOHNSTON, a citizen of the United States, residing at Scottsbluff, in the county of Scotts Bluff and State of Nebraska, have invented certain new and useful Improvements in Fruit Gatherers; and I do hereby declare the following to be a full, clear, and exact description of the invention, such as will enable others skilled in the art to which it appertains to make and use the same.

When harvesting prunes, fruit, nuts and the like grown upon trees, the latter are usually shaken to detach the product which generally falls upon the ground and is subsequently picked up and sorted, leaves, twigs and bruised fruit being discarded.

The present invention facilitates the gathering of prunes and other tree grown products and materially lessens the labor and reduces the cost incident thereto, besides cushioning the fall and thereby saving much fruit which otherwise would be injured and rendered unfit for marketable purposes.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a perspective view of one form of the invention,

Figure 2 is a detail section on line 2—2 of Fig. 1,

Figure 3 is a detail of the means for closing the opening of the frame,

Figure 4 is a view similar to Figure 1 of a modification,

Figure 5 is a sectional view on line 5—5 of Fig. 4, and

Figure 6 is a detail of the means for closing the tree opening of the apron.

Fig. 7 is a detail view partly in cross section, showing the guard and the flap covering the tree opening.

Corresponding and like parts are referred to in the following description and designated in the several views of the drawings by like reference characters.

The device comprises an apron to be placed about a trunk of a tree beneath the branches thereof and a supporting frame for the apron. The apron and its supporting frame have a side opening to admit of placing the device about the tree or removing it therefrom. The apron may be of any textile fabric and usually consists of canvas. The supporting frame may be of metal or wood, or a combination of such materials.

In the form illustrated in Figure 1 and the detail views thereof, the supporting structure for the apron comprises a circular frame 1, legs 2 and braces 3. Each of the legs 2 is provided with a pair of braces 3 which extend from opposite sides thereof to the frame 1. The frame 1 inclines to the horizontal and is provided at its lowest point with a spout 4 for delivery of the fruit. One pair of legs are longer than the other legs to give the desired inclination to the frame 1 to insure positive discharge of the fruit at the spout 4. The apron 5 is secured at its outer edge to frame 1 and slopes to the spout 4 to direct the fruit to the delivery point. The spout 4 is usually of sheet metal and is disposed below the frame 1 a distance to insure sufficient slope to the apron 5 or positive delivery of the fruit to the spout. The spout 4 projects some distance from opposite sides of the frame 1 and the apron 5 is depressed and riveted or otherwise secured thereto. It will thus be understood that the apron 5 is continuous and forms a lining for the spout. A gate 6 closes an opening formed in a side of the frame 1, said opening being of such size as to admit of the device being fitted about the largest size trees. The gate 6 is hinged at one end to the frame 1 bordering upon the tree opening and when closed is made secure at its opposite end by suitable fastening means such as indicated at 7.

The apron 5 has a central opening to receive the trunk of the tree and a slit extends outwardly from said opening through an edge of the apron opposite the opening of the frame 1 closed by the gate 6. This admits of placing the device about a tree or removing it therefrom. A guard 8 is in line with the central opening of the apron 5 and is stitched or otherwise fastened thereto at its lower end and is formed in a side with a slit to admit of ingress and egress of the tree according as the device is placed in position or removed. The guard 8 is of textile such as canvas and is of tapering form. Suitable fastening means are provided for connecting the parts of the apron 5 and guard 8 bordering upon the slit thereof. As shown, hooks 9 and eyes 10 are attached to elastic straps 11 which in turn are fastened to the respective edge portions of the parts 5 and 8 bordering upon the slit thereof. The elastic straps 11 maintain the parts under tension which is essential for effective operation. The guard 8 extends upwardly and is fitted about the trunk of the tree above the apron 5. This assists materially in supporting the apron at a central point and prevents any escape of the produce at the tree opening. Truss rods 12 are disposed upon opposite sides of the opening closed by the gate 6 and connect opposite portions of the frame 1. These truss rods are constructed and disposed in a manner so as not to interfere with the free movement of the fruit over the apron 5 towards the discharge spout 4. The component parts of the supporting structure illustrated in Figure 1 are preferably of metal and consist of bars of any cross sectional form.

The supporting structure illustrated in Figure 4 is substantially the same as that shown in Figure 1, the chief difference residing in the selection of material and the consequent form. The frame 1$^a$ is of rectangular formation because embodying wooden bars. The legs 2 are disposed at the corners of the frame. The braces 3 extend from opposite sides of the legs 2 to adjacent side bars of the frame 1$^a$. The frame 1$^a$ inclines to the horizontal in a manner substantially as herein indicated and is provided in a side with an opening which is closed by means of a gate 6$^a$. The gate 6$^a$ is a bar removably and slidably retained in position in any manner, preferably by loops 13 secured on the frame and is held against displacement merely by the snug fit thereof in the loops. A spout 4 is provided at the lowest point of the apron for the delivery of the fruit in a manner herein stated. The apron 5 is depressed and secured to the spout. A flap 14 closes the apron and extends over the fastening means of the slit provided in the apron 5, thereby preventing the escape of any fruit or the retarding of the discharge when passing over the apron. A flap 15 closes the slit formed in a side of the guard 8 and extends over the fastening means thereof.

The device is portable and may be readily shifted from one tree to another. When the gate of the frame is removed and the slits of the apron 5 and guard 8 released, the device may be placed in position about a tree or removed therefrom. When the device is in position the apron is located below the branches of the tree and surrounds the trunk thereof. When the tree or branches thereof is shaken, the fruit dislodged falls upon the apron 5, and by reason of the inclination of the latter the fruit is directed to the spout 4 and discharged at one point. A suitable receptacle is located below the spout to receive the fruit. An attendant positioned at the spout sorts and separates the fruit and rejects leaves, twigs and undesirable or over ripe fruit. The device is shifted from one tree to another as the gathering proceeds. It will be understood that the fruit is cushioned in its fall and is prevented from being bruised or broken, thereby producing a material saving over the method of shaking the fruit upon the ground.

What is claimed is:

1. A fruit gatherer comprising an apron having a tree opening and a slit extending outwardly therefrom, a supporting frame for the apron having an opening in line with the slit thereof for the ingress and egress of the trees, and a gate for closing the opening of the frame.

2. A fruit gatherer comprising an apron having a tree opening and a slit extending outwardly therefrom, a supporting frame for the apron having an opening in a side in line with the slit of the apron, a gate for closing the opening of the frame, and truss rods disposed upon opposite sides of the opening of the frame and connecting opposite portions thereof.

3. A fruit gatherer comprising a frame, relatively long legs therefor, relatively short legs for the frame, braces between opposite sides of the legs and the frame, the latter having an opening in a side, a gate for closing said opening, truss rods upon opposite sides of the opening and connecting opposite portions of the frame, an apron attached to the frame and having a tree opening, and a slit extending outwardly therefrom in line with the opening of the frame, a tapering flexible guard secured to the apron in line with the tree opening thereof and having a slit in a side in line with the slit of the apron, yieldable fastening means for the slit of the guard and apron, flaps for covering said slits and fastening means, and a spout at the lowest part of the frame and having the apron depressed and attached thereto.

In testimony whereof I affix my signature in presence of two witnesses.

JOHN A. JOHNSTON.

Witnesses:
J. H. CASSELMAN,
M. T. JOHNSTON.